US010961629B2

(12) United States Patent
Wang et al.

(10) Patent No.: US 10,961,629 B2
(45) Date of Patent: Mar. 30, 2021

(54) SUPERHYDROPHOBIC SURFACE ARRANGEMENT, ARTICLE COMPROMISING SAME AND METHOD OF MANUFACTURE THEREOF

(71) Applicant: City University of Hong Kong, Hong Kong (HK)

(72) Inventors: Zuankai Wang, Hong Kong (HK); Yahua Liu, Hong Kong (HK)

(73) Assignee: CITY UNIVERSITY OF HONG KONG, Kowloon Tong (HK)

( * ) Notice: Subject to any disclaimer, the term of this patent is extended or adjusted under 35 U.S.C. 154(b) by 35 days.

(21) Appl. No.: 16/233,325

(22) Filed: Dec. 27, 2018

(65) Prior Publication Data

US 2019/0127856 A1 May 2, 2019

Related U.S. Application Data

(63) Continuation-in-part of application No. 14/606,105, filed on Jan. 27, 2015, now abandoned.

(51) Int. Cl.
*C23F 1/14* (2006.01)
*B08B 17/06* (2006.01)
(Continued)

(52) U.S. Cl.
CPC ............. *C23F 1/14* (2013.01); *B08B 17/065* (2013.01); *C09D 5/1681* (2013.01); *C23F 1/34* (2013.01); *C23G 1/10* (2013.01); *B05D 5/083* (2013.01); *B23H 7/02* (2013.01); *B23H 9/18* (2013.01); *B82Y 30/00* (2013.01); *B82Y 40/00* (2013.01); *C09D 7/65* (2018.01); *C23C 2222/20* (2013.01)

(58) Field of Classification Search
CPC ...... B08B 17/065; C09D 5/1681; C09D 7/65; C23F 1/14; C23F 1/34; C23G 1/10; C23C 2222/20; B82Y 30/00; B82Y 40/00; B05D 5/083; B23H 7/02; B23H 9/18
See application file for complete search history.

(56) References Cited

U.S. PATENT DOCUMENTS

2007/0224391 A1   9/2007  Krupenkin et al.
2016/0214152 A1   7/2016  Wang et al.

FOREIGN PATENT DOCUMENTS

CN          103640278 A      3/2014

OTHER PUBLICATIONS

Denis Richard et al., Contact Time of a Bouncing Drop, Nature Publishing Group, vol. 417, Jun. 20, 2002.
(Continued)

*Primary Examiner* — Maria V Ewald
*Assistant Examiner* — Ethan Weydemeyer
(74) *Attorney, Agent, or Firm* — Melvin Li; Heslin Rothenberg Farley & Mesiti PC

(57) ABSTRACT

The present invention is concerned with a superhydrophobic surface arrangement, an article having the same and a method of making same. The arrangement is configured for generating, upon contact by water droplets, pancaking bouncing and reducing liquid contact time. The arrangement has an array of posts residing on a surface and extending from the surface, said posts having an elongate configuration with a base portion at one end and an upper portion at an opposite end. By way of the configuration of the posts and the Weber number the surface arrangement in use pancake bouncing of liquid droplets and reduction of contact time of the liquid droplets are effected.

6 Claims, 7 Drawing Sheets

(51) Int. Cl.

| | |
|---|---|
| C23F 1/34 | (2006.01) |
| C09D 5/16 | (2006.01) |
| C23G 1/10 | (2006.01) |
| B82Y 40/00 | (2011.01) |
| B82Y 30/00 | (2011.01) |
| B23H 7/02 | (2006.01) |
| C09D 7/65 | (2018.01) |
| B05D 5/08 | (2006.01) |
| B23H 9/18 | (2006.01) |

(56) References Cited

OTHER PUBLICATIONS

James C. Bird et al., Reducing the Contact Time of a Bouncing Drop, Macmillan Publishers Limited, vol. 503, Nature, Nov. 21, 2013.
Stefan Jung et al., Mechanism of Supercooled Droplet Freezing on Surfaces, Nature Communications, published Jan. 10, 2012.
Lidiya Mishchenko et al., Design of Ice-Free Nanostructured Surfaces Based on Repulsion of Impacting Water Droplets, ACSNANO, vol. 4, No. 12, 2010.
Howard A. Stone, Ice-Phobic Surfaces that are Wet, ACSNANO, vol. 6, No. 8, 2012.
Xuemei Chen et al., Nanograssed Micropyramidal Architectures for Continuous Dropwise Condensation, Advanced Functional Materials, 2011.
Ralf Blossey, Self-Cleaning Surfaces-Virtual Realities, Nature Materials, vol. 2, May 2003.
Anish Tuteja et al., Designing Superoleophobic Surfaces, Science Mag, vol. 318, Dec. 7, 2007.
Xu Deng et al., Candle Soot as a Template for a Transparent Robust Superamphiphobic Coating, Science Mag, vol. 335, Jan. 6, 2012.
K. Okumura et al., Water Spring: A Model for Bouncing Drops, Europhysics Letters, 62 (2), Apr. 15, 2003.
M. Reyssat et al., Bouncing Transitions on Microtextured Materials, Europhysics Letters, 74 (2), Apr. 15, 2006.
D. Bartolo et al., Bouncing or Sticky Droplets: Impalement Transitions on Superhydrophobic Micropatterned Surfaces, Europhysics Letters, 74 (2), Apr. 15, 2006.
Matthew McCarthy et al., Biotemplated Hierarchical Surfaces and the Role of Dual Length Scales on the Repellency of Impacting Droplets, Applied Physics Letters, 100, 2012.
S. Moulinet et al., Life and Death of a Fakir Droplet: Impalement Transitions on Superhydrophobic Surfaces, The European Physical Journal E, 24, 2007.
Yong Chae Jung et al., Dynamic Effects of Bouncing Water Droplets on Superhydrophobic Surfaces, Langmuir, 2008.
Tae-Gon Cha et al., Nanoscale Patterning of Microtextured Surfaces to Control Superhydrophobic Robustness, Langmuir Article, published Feb. 12, 2010.
Tuan Tran et al., Droplet Impact on Superheated Micro-Structured Surfaces, Soft Matter, RSC Publishing, 2013.
Xinhua Chen et al., Synthesis and Characterization of Superhydrophobic Functionalized Cu(OH)2 Nanotube Arrays on Copper Foil, Applied Surface Science, 2009.
Chrisophe Clanet et al., Maximal Deformation of an Impacting Drop, J. Fluid Mech. vol. 517, 2004.
Ivan U. Vakarelski et al., Stabilization of Leidenfrost Vapour Layer by Textured Superhydrophobic Surfaces, Nature, vol. 489, Sep. 13, 2012.
Andreas N. Lembach et al., Drop Impact, Spreading, Splashing, and Penetration into Electrospun Nanofiber Mats, Langmuir Article, Mar. 5, 2010.
Xu Deng et al., Liquid Drops Impacting Superamphiphobic Coatings, Langmuir Article, May 22, 2013.
Lei Xu et al., Drop Splashing on a Dry Smooth Surface, Physical Review Letters, May 2013.
Robert N. Wenzel, Resistance of Solid Surfaces to Wetting by Water, Industrial and Engineering Chemistry, vol. 28, No. 8, Mar. 27, 1936.
A. B. D. Cassie et al., Wettability of Porus Surfaces, RSC Org, published Jan. 1, 1944.
Aurelie Lafuma et al., Superhydrophobic States, Nature Materials, vol. 2, Jul. 2003.
Tuukka Verho et al., Reversible Switching Between Superhydrophobic States on a Hierarchically Structured Surface, PNAS vol. 109, No. 26, Jun. 26, 2012.
A.L. Yarin, Drop Impact Dynamics: Splashing, Spreading, Receding, Bouncing . . . , Annu. Rev. Fluid Mech. 2006.
David Quere, Wetting and Roughness, Annu. Rev. Mater. Res. 2008.
Yongmei Zheng et al., Directional Water Collection on Wetted Spider Silk, Nature Letters, vol. 463, Feb. 4, 2010.
Shirtcliffe et al., "Wetting and Wetting Transitions on Copper-Based Super-Hydrophobic Surfaces," Jan. 7, 2005, Langmuir, American Chemical Society, Issue 21, pp. 937-943.
Office Action in U.S. Appl. No. 14/606,105, filed Oct. 18, 2016, 50 pgs.
Final Office Action in U.S. Appl. No. 14/606,105, filed Jun. 15, 2017, 20 pgs.
Office Action in U.S. Appl. No. 14/606,105, filed Mar. 7, 2018, 16 pgs.
Final Office Action in U.S. Appl. No. 14/606,105, filed Oct. 1, 2018, 16 pgs.

SUPERHYDROPHOBIC SURFACE ARRANGEMENT, ARTICLE COMPROMISING SAME AND METHOD OF MANUFACTURE THEREOF

CROSS REFERENCE TO RELATED APPLICATION

The present invention is a continuation-in-part from U.S. patent application Ser. No. 14/606,105 filed on Jan. 27, 2015, the entire disclosure of which is incorporated herein by reference.

FIELD OF THE INVENTION

The present invention is concerned with a superhydrophobic surface arrangement, an article comprising such arrangement, and a method of manufacture of thereof.

BACKGROUND OF THE INVENTION

Engineering surfaces that promote rapid detachment of liquid drops are of importance to a wide range of applications including anti-icing, drop-wise condensation, and self-cleaning. The prior art has proposed superhydrophobic surface arrangements which may be able to allow some degree of drop detachment although they are not satisfactory. In the field of surface engineering, due to the numerous factors which could play into the surface there has been on-going challenges to provide specific surface arrangements which can yield a particular and effective liquid contact behavior.

The present invention seeks to provide a superhydrophobic surface arrangement with significantly improved drop detachment capability in that the particular surface arrangement can effect not pancake bouncing but also reduction of contact time, or at least to provide an alternative to the public.

SUMMARY OF THE INVENTION

According to a first aspect of the present invention, there is provided a superhydrophobic surface arrangement for generating, upon contact by water droplets, pancaking bouncing and reducing liquid contact time, comprising an array of posts residing on a surface and extending from the surface, the posts having an elongate configuration with a base portion at one end and an upper portion at an opposite end, wherein:
  the posts have a height from 1 to 2 mm;
  a center to center distance of two adjacent posts is from 0.1 to 0.4 mm;
  spacing of said two adjacent posts is from 0.05 to 0.3 mm;
  the posts have a profile selected from a straight post or a conical post profile;
  the posts have a base with a width or diameter of 0.05 to 0.2 mm;
  the posts have a top with a width or diameter of 0.02 to 0.2 mm;
  the surface arrangement has a Weber number of 12.6 to 80; and
wherein by way of the configuration of the posts and the Weber number the surface arrangement in use pancake bouncing of liquid droplets and reduction of contact time of the liquid droplets are effected.

Preferably, the posts when having the straight post profile may be in the form of a square column, and the posts when having the conical profile may have a truncated profile with a substantially flat top.

According to a second aspect of the present invention, there is provided a substrate comprising a superhydrophobic arrangement as described above.

Preferably, the method may comprise steps of forming said posts by wire cutting and cyclic chemical etching.

Suitably, the posts may be formed from cooper.

BRIEF DESCRIPTION OF THE DRAWINGS

Some embodiments of the present invention will now be explained, with reference to the accompanied drawings, in which.

DETAILED DESCRIPTION OF PREFERRED EMBODIMENTS OF THE INVENTION

In the field of superhydrophobic surface arrangements, there had been a constant challenge to provide a surface arrangement which can effect a reduced liquid contact time when liquid droplets (e.g. water droplets) engage the surface. For example, it had been difficult for scientists to provide a surface which can effect a pancake bouncing behavior and a reduced liquid contact time. Alternatively, liquid drops in contact with the surface tend spread to spread and stay with the surface. Alternatively, the liquid drops may only bounce away in a random manner but without firstly forming a pancake bouncing profile. In other instances, the liquid drops, regardless the physical profile thereof during bouncing, tend to require relatively long time before they can disengage from the surface.

The present invention is concerned with a superhydrophobic arrangement such as a superhydrophobic surface patterned with lattices of submillimetre-scale posts which, on engagement by liquid droplets (e.g. water droplets) would generate pancake bouncing of the droplets and reduce the contact time of the droplets after they have engaged the surface. During the course leading to the present invention, it was identified that a surface configuration contributed by a specific combination of surface parameters, upon engagement of liquid droplets, can generate a pancake bouncing behavior and a reduced contact time of the liquid droplets. The present invention allows for a substantially four-fold reduction in contact time compared to a conventional complete rebound. Conventional complete rebound referred herein are systems discussed in Richard et al 2002, Reyssat et al, Okumura et al 2003 and McCarthy et al 2012 in which the contact time in terms of C is substantially 2.6. Studies leading to the present invention show that with such arrangement the pancake bouncing results from the rectification of capillary energy stored in the penetrated liquid into upward motion adequate to lift the drop. With such configurations, the timescales become independent of the impact velocity, allowing the occurrence of pancake bouncing and rapid drop detachment over a wide range of impact velocities. The studies also show that while nano-textures may further improve the bouncing behavior, they are not necessary in the context of the present invention.

Figure 1A:
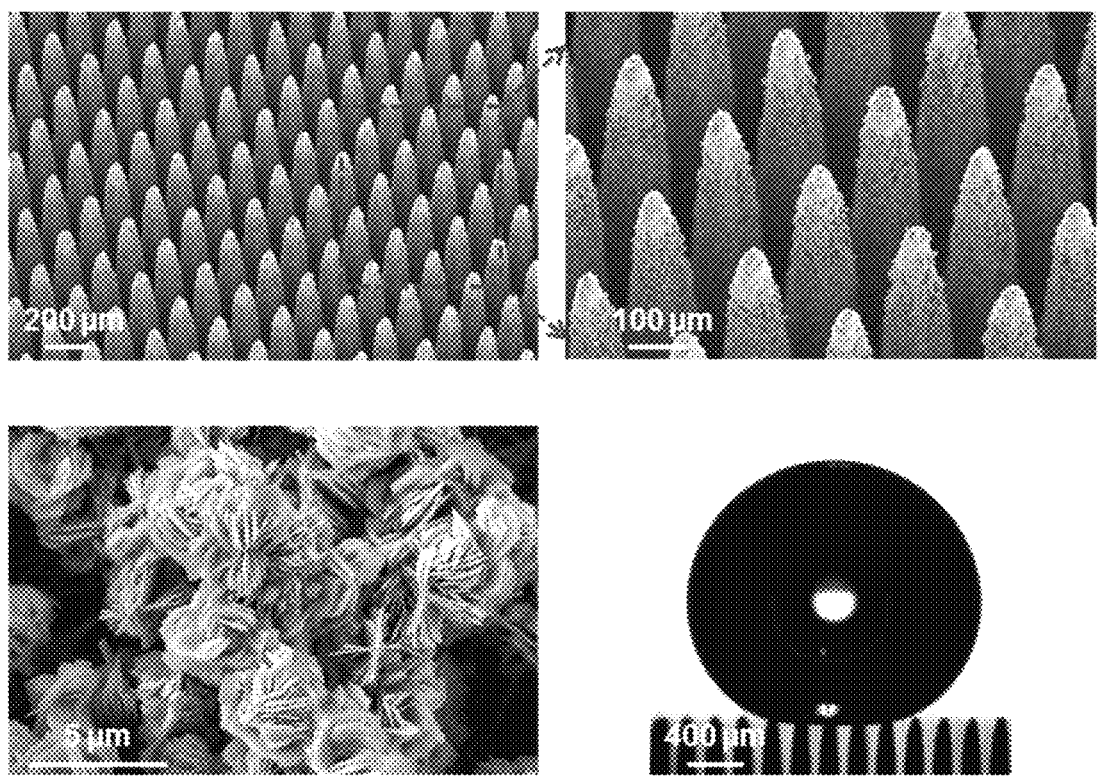
FIGS. 1A to 1E illustrate an embodiment of surface characterization of a superhydrophobic surface arrangement in accordance with the present invention, and are illustration of drop impact dynamics of the arrangement.

In one embodiment of the present invention, there is provided a copper surface arrangement patterned with a square lattice of tapered posts decorated with nanostructures. Please see FIG. 1 and in particular FIG. 1A. FIG. 1A illustrates scanning electronic micrograph image of the copper surface patterned with a square lattice of tapered posts. The posts have a circular cross section with a diameter (or width) that increases continuously and linearly from substantially 20 to 90 μm with depth although studies leading to the present invention show that the workable diameter of the top and the base of the posts may range from 0.02 to 0.2 mm and 0.05 to 0.2 mm, respectively. The center-to-center distance and the height of the posts are substantially 200 μm and 800 μm, respectively, although studies leading to the present invention show that the workable center-to-center distance and the height of the posts are 0.1 to 0.4 mm and >1 to 2 mm, respectively. The spacing between two adjacent posts is substantially 0.1 mm although studies have shown that the workable spacing may be 0.05 to 0.3 mm.

Figure 1B:
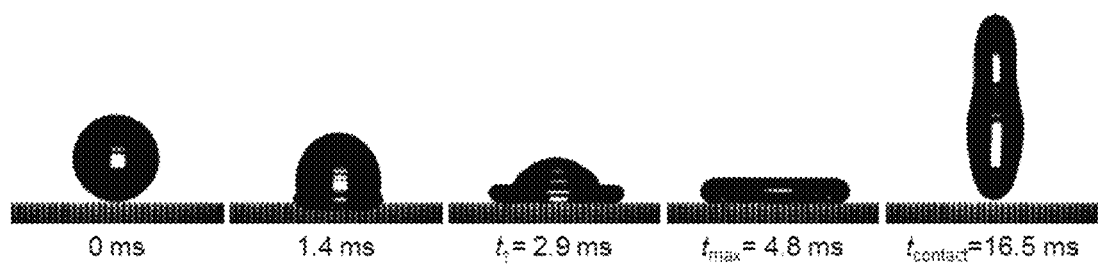
Figure 1C:
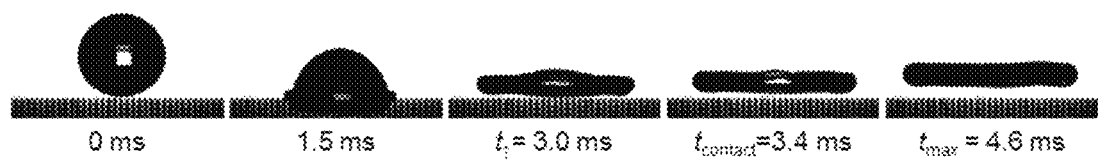
Figure 1D:
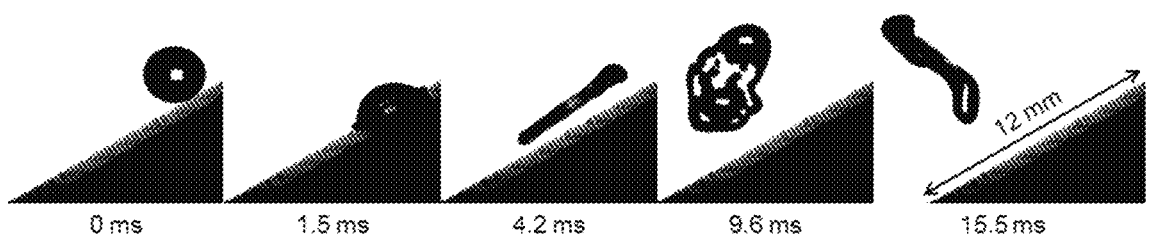
Figure 1E:
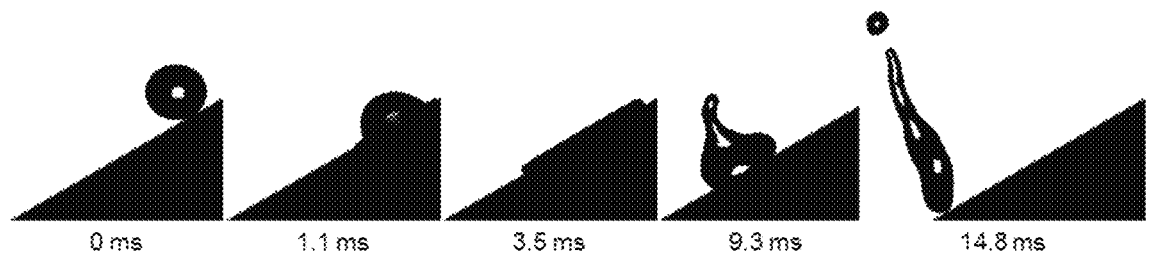

FIG. 1B shows selected snapshots captured by the high speed camera showing a drop ($r_0$=1.45 mm) impacting on the tapered surface at We=7.1. On touching the surface at t=0, part of the drop penetrates into the post arrays and recoils back (driven by capillary force) to the top of the surface at $t_I$~2.9 ms. Here, $t_I$ is the time interval between the moments when the drop first touches the surface and when the substrate is completely emptied, during which fluid undergoes the downward penetration and upward capillary emptying processes. After reaching a maximum lateral extension at $t_{max}$~4.8 ms, the drop retracts on the surface and finally detaches from the surface at $t_{contact}$ (~16.5 ms). FIG. 1C show selected snapshots showing a drop impacting on the tapered surface at We=14.1. The drop bounces off the surface in a pancake shape at ~3.4 ms. FIGS. 1D and 1E shows selected snapshots showing a drop impinging on the tapered surface and superhydrophobic surface, respectively, under a tilt angle of 30° at We=31.2. The drop in FIG. 1D impinging on the tapered surface exhibits a pancake bouncing, while the drop in FIG. 1E on the nanostructured surface follows a conventional bouncing pathway. The contact time in the case of pancake bouncing is 3.6 ms, which is four-fold shorter than that on the conventional nanostructured superhydrophobic surfaces (~16.5 ms). The lower end or the base of the posts have a wider diameter or width, while towards the upper or distal end the posts have a diameter or width are narrowing.

The post surface is fabricated using a wire cutting machine followed by chemical etching to generate the posts. After a thin polymer coating, trichloro(1H,1H,2H,2H-peruorooctyl)silane, is applied, the surface exhibits a superhydrophobic property with an apparent contact angle of over 165°. The advancing and receding contact angles are 167.2±1.1° and 163.9±1.4°, respectively. Water drop impact experiments were conducted using a high speed camera at the rate of 10,000 frames per second. The unperturbed radius of the drop is $r_0$=1.45 mm or 1.10 mm, and the impact velocity ($v_0$) ranges from 0.59 ms$^{-1}$ to 1.72 ms$^{-1}$, corresponding to 7.1<We<58.5, where We=$\rho v_0^2 r_0/\gamma$ is the Weber number, with $\rho$ the density and $\gamma$ being the surface tension of water.

FIG. 1B shows selected snapshots of a drop impinging on such a surface at We=7.1. On touching the surface at t=0, part of the drop penetrates into the post arrays in a localized region with the radius approximately equivalent to the initial drop radius and recoils back, driven by the capillary force, to the top of the surface at 2.9 ms. After reaching a maximum lateral extension 19 at 4.8 ms, the drop retracts on the surface and finally detaches from the surface at 16.5 ms(=2.55$\sqrt{\rho r_0^3/\gamma}$). This contact time is in good agreement with previous results for conventional complete rebound. However, at higher We, the drop exhibits a distinctively different bouncing behaviour, which is referred as pancake bouncing, as exemplified by an impact at We=14.1. Please see FIG. 1C. In this case, the liquid penetration is deeper and the drop detaches from the surface (at 3.4 ms=0.53$\sqrt{\rho r_0^3/\gamma}$) immediately after the capillary emptying without experiencing retraction.

Figure 2A:
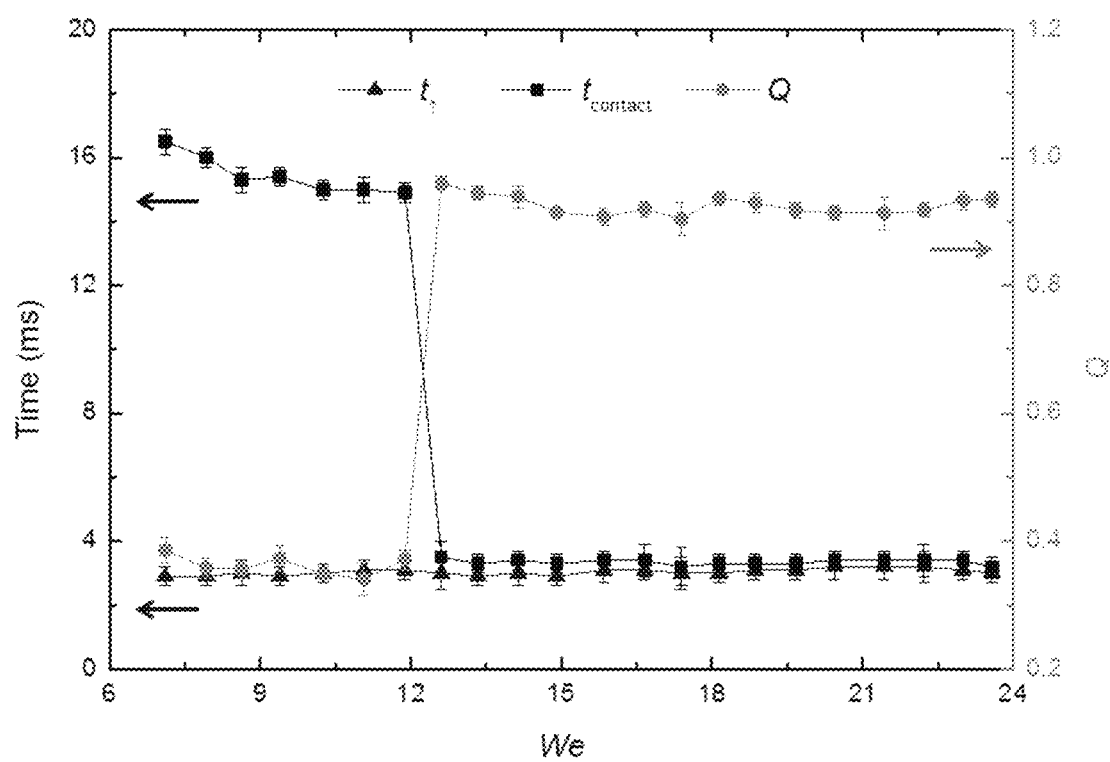
FIGS. 2A to 2B are graphs showing timescale analysis of drop impact on surface arrangement such as the one of FIG. 1A.
Figure 2B:
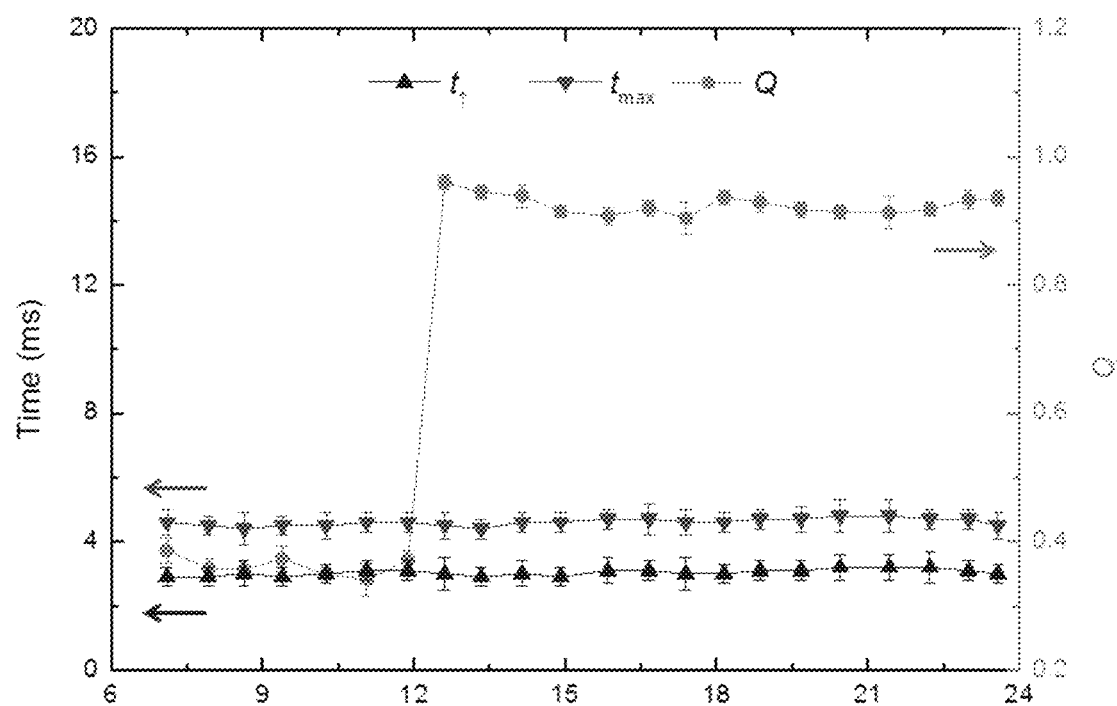

The difference in bouncing dynamics between conventional rebound and pancake bouncing can be quantified by the ratio of the diameter of the drop when it detaches from the surface $d_{jump}$ to the maximum spreading width of the drop $d_{max}$. The ratio Q=$d_{jump}/d_{max}$ is defined as the pancake quality, with Q>0.8 referred to as pancake bouncing. At low Weber number (We<12.6), the pancake quality Q is ~0.4, corresponding to conventional bouncing. Please see FIG. 2 and in particular FIG. 2A. FIG. 2A shows the variations of $t_I$, $t_{contact}$ (left y axis), and pancake quality Q (=$d_{jump}$=$d_{max}$, right y axis) with We for drop radius $r_0$=1.45 mm. At low We<12, the drop exhibits conventional bouncing with $t_{contact}$ much larger than $t_I$. However, at high We>12 the drop bounces as a pancake with t~$t_{contact}$. FIG. 2B shows the variations of $t_{554}$, $t_{max}$ (left y axis) and Q (right y axis) with We. $t_I$ and $t_{max}$ are nearly constant over a wide range of We from 8 to 24. Each data point is the average of three measurements. Error bars denote the range of the measurements.

However, for We>12.6 there is a clear crossover to Q~1, which corresponds to pancake bouncing. Moreover, a defining feature of pancake bouncing, of particular relevance to applications aimed at rapid drop shedding, is the short contact time of the drop with the solid surface. In the case of pancake bouncing, the contact time, $t_{contact}$, is reduced by a factor of over four to 3.4 ms as compared to conventional rebound.

Drop impact experiments were also performed on tilted surfaces which is more relevant geometrically to practical applications, such as self-cleaning, de-icing and thermal management. FIG. 1D shows selected snapshots of a drop impinging on the tapered surface with a tilt angle of 30° at We=31.2. The drop impinging on the tilted tapered surface also exhibits pancake bouncing. Moreover, the drop completely detaches from the surface within 3.6 ms and leaves the field of view without bouncing again. Comparison was also made on the drop impact on the tilted surface with nanoflower structure alone. The apparent contact angle of the nanostructured surface is 160±1.8°. It is evident that a drop impinging on such a surface follows a conventional bouncing pathway: the drop spreads to a maximum diameter, recoils back, and finally leaves the surface within 14.5 ms. Please see FIG. 1E.

These results indicate that the pancake bouncing of a drop occurring close to its maximum lateral extension results from the rectification of the capillary energy stored in the penetrated liquid into upward motion adequate to lift the entire drop. Moreover, for the drop to leave the surface in a pancake shape, the timescale for the vertical motion between posts should be comparable to that for the lateral spreading. In order to illustrate that pancake bouncing is driven by the upward motion rendered by the capillary emptying, comparison was made between the two timescales $t_{contact}$ and $t_I$, where $t_I$ is the time interval between the moment when the drop first touches the surface and when the substrate is completely emptied, during which fluid undergoes the downward penetration and upward capillary emptying processes. As shown in FIG. 2A, in the regime of pancake bouncing, $t_{contact}$ and $t_I$ are close, indicating that the pancake bouncing is driven by the upward motion of the penetrated liquid. For smaller We (<12.6), the two time scales diverge: $t_I$ remains approximately constant while contact increases sharply. This is because, at low We, the penetrated liquid does not have the kinetic energy sufficient to lift the drop at the end of the capillary emptying. Accordingly, the drop continues to spread and retract in contact with the surface before undergoing conventional bouncing. Variations of $t_I$, $t_{max}$, and Q with We were plotted, where $t_{max}$ is the time when the drop reaches its maximum lateral extension. Please see FIG. 2A. On tapered surfaces, $t_I$ and $t_{max}$ are comparable with each other for all the We measured. However, at low We (<12.6), there is no pancake bouncing due to insufficient energy to lift the drop, further indicating that the occurrence of pancake bouncing necessitates the simultaneous satisfaction of sufficient impact energy and comparable timescales.

Comparison was made on the experimental results for bouncing on straight square posts covered by nanoflower structures. The post height and edge length (b) are 1.2 mm and 100 μm, respectively. It was observed that the pancake bouncing behavior is also affected by center-to-center post spacing and We. Pancake bouncing is absent on post arrays with center to center spacing w=200 μm, whereas it occurs for surfaces with w=300 μm and 400 μm.

Figure 3A:
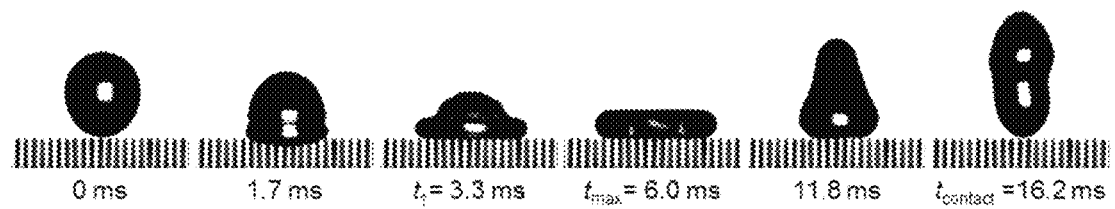
FIGS. 3A to 3B are snapshots showing drop impact dynamics on an embodiment of surface arrangement with straight square posts.
Figure 3B:
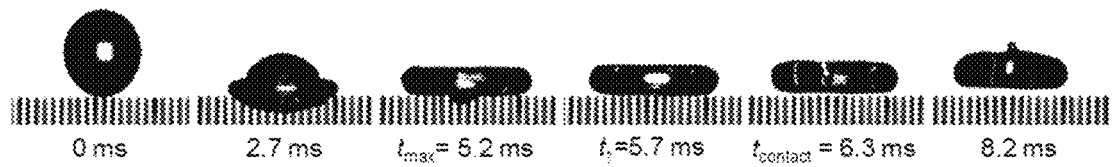

FIG. 3A shows selected snapshots of a drop impinging on straight posts decorated with nanoflowers with a post centre-to-centre spacing of 300 μm at We=4.7. The drop exhibits conventional rebound with pancake quality Q~0.59. $t_{max}$~6.0 ms is much larger than $t_I$~3.3 ms. FIG. 3B shows selected snapshots of a drop impinging on post arrays with a post centre-to-centre spacing of 300 μm at We=7.9. Pancake bouncing is observed with pancake quality Q~0.98, $t_{max}$~5.2 ms is slightly less than $t_I$~5.7 ms.

Figure 3C:
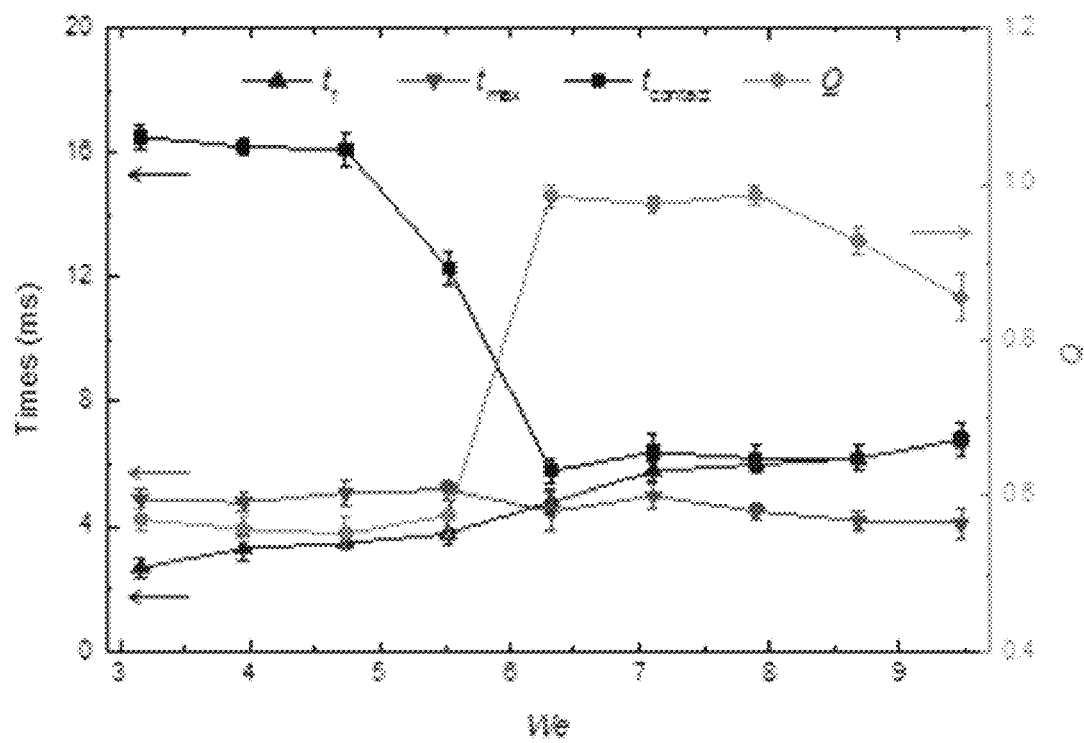
FIG. 3C is a graph showing the variations of $t_{554}$, $t_{max}$, $t_{contact}$ (left y axis) and Q (right y axis) with We.

FIGS. 3A and 3B compare results for the bouncing of a drop ($r_0$~1.45 mm) on the surface with spacing 300 μm at We=4.7 and 7.9, respectively. In the former case, the drop exhibits a conventional complete rebound, with Q~0.59 and $t_{contact}$~16.2 ms. In the latter case, the drop shows pancake bouncing with Q~0.98 and a much reduced contact time $t_{contact}$ 6.3 ms. FIG. 3C shows the variations of $t_I$, $t_{max}$, $t_{contact}$, and Q with We for this surface. In the region of pancake bouncing (6.3≤We≤9.5), the proximity of $t_{contact}$ and $t_I$ and the matching between $t_{max}$ and $t_I$ are consistent with the observations on tapered surfaces. By contrast, in the non-pancake bouncing region (We≤6.3), there is a large divergence between $t_{contact}$ and $t_I$, because We is too small to allow drop bouncing as a pancake. This further confirms that the occurrence of pancake bouncing necessitates simultaneous satisfaction of the two criteria. In contrast to what is observed for tapered surfaces, a dependence of $t_I$ on We is noted to appear on straight posts. Moreover, it is shown that the maximum jumping height of drops in a pancake shape on straight posts is three-fold smaller than that on tapered surfaces (2.88 mm and 0.9 mm, respectively) and that the contact time (~6.3 ms) on straight posts is larger than that (~3.4 ms) on tapered surfaces. All these characteristics and behaviors reveal that the pancake bouncing on tapered surfaces is more pronounced and robust than that on straight posts. However, at high We>6.3, the drop bounces in the shape of a pancake with $t_I$~contact. Unlike on the tapered surfaces, $t_I$ increases with increasing We. Each data point is the average of three measurements. Error bars denote the range of the measurements.

Analysis was conducted to elucidate the enhanced pancake bouncing observed on tapered posts in comparison to straight posts. The timescale $t_{max}$ scales as $\sqrt{\rho r_0^3/\gamma}$, independent of the impact velocity. To calculate $t_I$, the kinetics involved in the processes of liquid penetration and capillary emptying was considered. Here, the viscous dissipation was neglected since the Reynolds number in the impact process is ~100. The liquid penetrating into the space between posts is subject to a capillary force, which serves to halt and then reverse the flow. The capillary force can be approximated by bnγ cos $\theta_\gamma$, where n is the number of posts wetted, and $\theta_\gamma$ is the intrinsic contact angle of the nanoflower-covered posts. The deceleration (acceleration) of the penetrated liquid moving between the posts scales as $a_1$~bγ cos $\theta_\gamma/(\rho r_0 w^2)$, where the drop mass ~$\rho r_0^3$, n~$r_0^2/w^2$, and it is considered that the liquid does not touch the base of the surface. It is to be noted that the number of posts wetted is independent of We because the penetrating liquid is mainly localized in a region with a lateral extension approximatively equivalent to the initial drop diameter, rather than the maximum spreading diameter. For straight posts, the acceleration is constant. Thus, $t_1$~$v_0/a_1$~$v_0 \rho r_0 w^2/(-b\gamma \cos \theta_\gamma)$, and the ratio of the two timescales can be expressed as $$k = t_\uparrow/t_{max} \sim \sqrt{We} \frac{w^2}{(-br_0 \cos\theta_Y)} \quad (1)$$

which scales as $\sqrt{We}$. These experiments show, and as discussed previously, that the occurrence of pancake bouncing requires t- and $t_{max}$ to be comparable, i.e., k~1. The dependence of k on We indicates that this condition can be satisfied only over a limited range of We.

Unexpectedly, k and We become decoupled by designing surfaces with tapered posts. Since the post diameter b now increases linearly with the depth z below the surface (that is, b~βz, where β is a structural parameter), the acceleration of the penetrated liquid moving between posts is linearly proportional to penetration depth (i.e., $a_\uparrow \propto z$). As a result, the surface with tapered posts acts as a harmonic spring with $t_\uparrow \propto \sqrt{w^2 r_0 \rho/(-\beta\gamma\cos\theta_\gamma)}$. Therefore, the ratio of timescales becomes $$k \sim \frac{w}{r_0\sqrt{-\beta \cos\theta_Y}} \quad (2)$$

which is independent of We.

Figure 4:
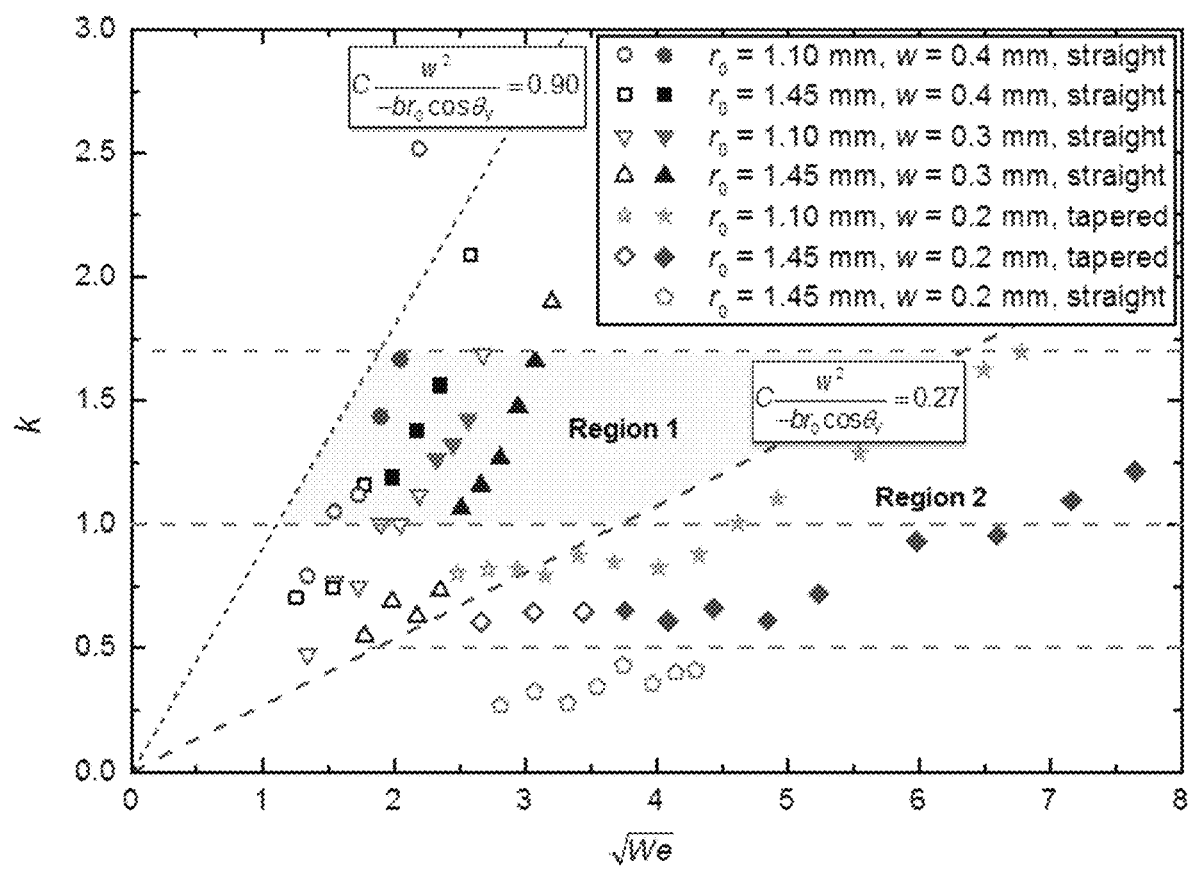
FIG. 4 is a graph showing the variation of the timescale ratio $k=t_1/t_{max}$ with $\sqrt{We}$.
Figure 5A:
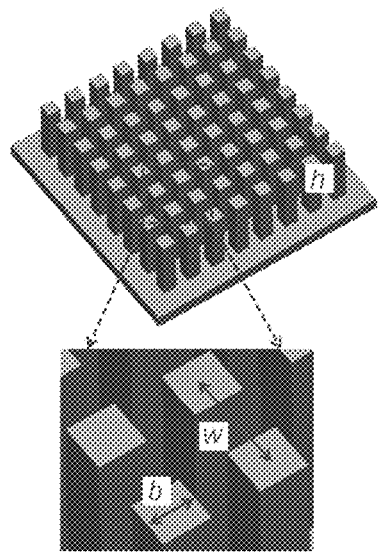
FIGS. 5A to 5C are schematic diagrams showing three different embodiments of surface arrangements in accordance with the present invention.
Figure 5B:
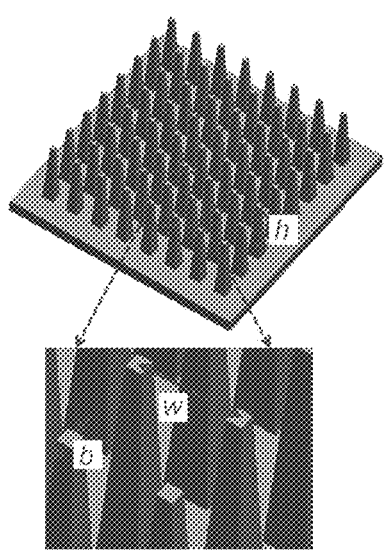
Figure 5C:
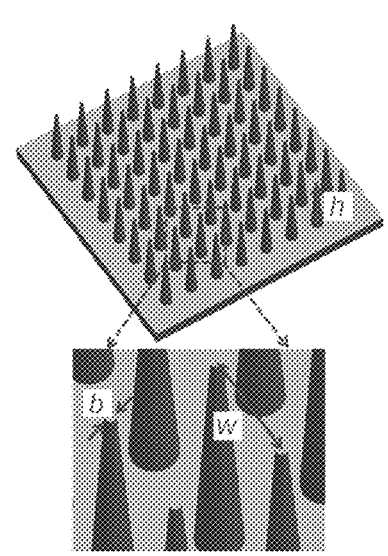
Figure 5D:
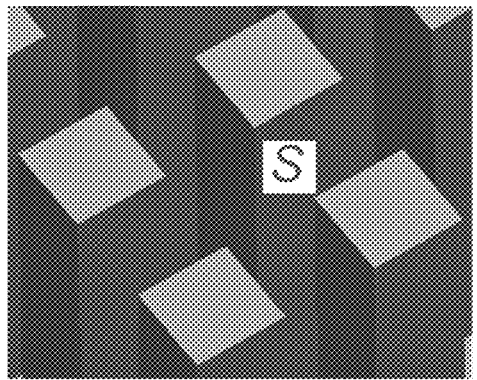
FIGS. 5D to 5E are schematic diagrams showing enlarged views of square columns of FIG. 5A.
Figure 5E:
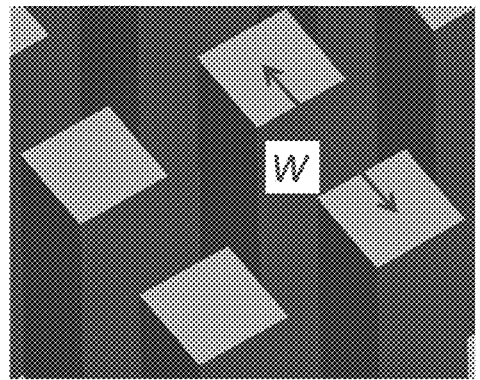

To pin down and demonstrate the key surface features and drop parameters for the occurrence of pancake bouncing, we plotted the variation of k with $\sqrt{We}$ in the design diagram. Please see FIG. 4. FIG. 4 shows the variation of the timescale ratio k=$t_\uparrow/t_{max}$ with $\sqrt{We}$, showing different pancake bouncing regions. Full symbols denote that the drop jumps as a pancake. Region 1 corresponds to the pancake bouncing on straight posts with 1.0<k<1.7 and We in a restricted range. The two slanting lines, corresponds to $-w^2/(br_0 \cos \theta_y)=0.45$ and 1.5 (based on equation (1), with a fitting prefactor C=0.6). Region 2 corresponds to pancake bouncing on tapered surfaces over a much wider range of k from 0.5 to 1.7 and We from 8.0 to 58.5. It is to be noted that k is independent of We over a wide range. It becomes weakly dependent on We for higher impact velocities due to the penetrated liquid hitting the base of the surface.

Filled symbols represent pancake bouncing (defined by Q>0.8) and open symbols denote conventional bouncing. Region 1 corresponds to the pancake bouncing occurring on straight posts with 1.0<k<1.7. The data show that k~$\sqrt{We}$ as predicted by equation (1) above. Such a dependence of k on We explains the limited range of We for which such rebound is observed in the experiments. The two slanting lines bounding Region 1 for pancake bouncing on straight posts correspond to $w^2/(-br_0 \cos\theta_y)=0.45$ and 1.5 in equation (1). For almost all the reported, this parameter takes values between 0.01 and 0.144, smaller than the threshold demonstrated in the studies leading to the present invention by at least one order of magnitude. On such surfaces, either the liquid penetration is insignificant (for example, owing to too narrow and/or too short posts) or the capillary energy stored cannot be rectified into upward motion adequate to lift the drop (for example, owing to an unwanted Cassie-to-Wenzel transition). Region 2 shows that the introduction of tapered posts significantly widens the range of timescale and Weber number for pancake bouncing, way beyond Region 1. In this Region, the pancake bouncing can occur over a wider range of k from 0.5 to 1.7 and We from 8.0 to 58.5. As illustrated above, for small We with moderate liquid penetration, the two timescales $t_{max}$ and $t_l$ are independent of We. They become weakly dependent on We for relative large We due to the penetrated liquid hitting the base of the surface, but the emergence of pancake bouncing is rather insensitive to the post height as long as this is sufficient to allow for adequate capillary energy storage. For much shorter posts, for example the tapered surface with a post height of 0.3 mm, there was no observation of pancake bouncing due to insufficient energy storage.

The novel pancake bouncing is also observed on a multi-layered, two-tier, superhydrophobic porous (MTS) surface. The top layer of the MTS surface consists of a post array with post centre-to-centre spacing of ~260 μm and the underlying layers comprise a porous medium of pore size 200 μm, naturally forming a graded pathway for drop penetration and capillary emptying. The typical contact time of the drop with the MTS surface is $t_{contact}$~5.0 ms and the range of We is between 12 and 35 for pancake bouncing. These values are comparable to those on tapered surfaces. Taken together, it is shown that tapered post surfaces and MTS surfaces of the present invention demonstrate the counter-intuitive pancake bouncing and is a general and robust phenomenon. Moreover, there is enormous scope for designing structures to optimize pancake bouncing for multifunctional applications.

Methods

Preparation of Tapered Surface and Straight Post Arrays

The tapered surface with a size of 2.0×2.0 cm² was created based on type 101 copper plate with a thickness of 3.18 mm by combining a wire-cutting method and multiple chemical etching cycles. Square posts in the configuration of square prisms arranged in a square lattice were first cut with a post centre-to-centre spacing of 200 μm. The post edge length and height are 100 μm and 800 μm, respectively. Then the as-fabricated surface was ultrasonically cleaned in ethanol and deionized water for 10 min, respectively, followed by washing with diluted hydrochloric acid (1 M) for 10 s to remove the native oxide layer. To achieve a tapered surface with post diameter of 20 μm at the top, six cycles of etching were conducted. In each cycle, the as-fabricated surface was first immersed in a freshly mixed aqueous solution of 2.5 $moll^{-1}$ sodium hydroxide and 0.1 $mll^{-1}$ ammonium persulphate at room temperature for ~60 mins, followed by thorough rinsing with deionized water and drying in nitrogen stream. As a result of chemical etching, CuO nanoflowers with an average diameter ~3.0 μm were produced. Note that the etching rate at the top of the posts is roughly eight-fold of that at the bottom of the surface due to the formation of an etchant solution concentration gradient generated by the restricted spacing between the posts. To facilitate further etching, after each etching cycle the newly-etched surface was washed by diluted hydrochloric acid (1 M) for 10 s to remove the oxide layer formed during the former etching cycle. Then another etching cycle was performed to sharpen the posts. In preparing the straight post arrays, only one etching cycle was conducted. All the surfaces were modified by silanzation through immersion in 1 mM n-hexane solution of trichloro(1H,1H,2H,2H-peruorooctyl)silane for ~60 mins, followed by heat treatment at ~150° C. in air for 1 hour to render surfaces superhydrophobic.

Preparation of MTS Surface

The MTS surface is fabricated on a copper foam with density 0.45 $gcm^{-3}$, porosity 94%, and thickness 0.16 cm. The nanostructure formation on the MTS surface and silanization were conducted using the same procedures described above.

Contact Angle Measurements

The static contact angle on the as-prepared substrate was measured from sessile water drops with a ramé-hart M200 Standard Contact Angle Goniometer. Deionized water drops of 4.2 μl, at room temperature with 60% relative humidity, were deposited at a volume rate of 0.5 l s⁻¹. The apparent, advancing ($\theta_a$) and receding contact angles ($\theta_r$) on the tapered surface with centre-to-centre spacing of 200 μm are 165.6°±1.3°, 167.2°±1.1° and 163.9°±1.4°, respectively. The apparent (equivalent to the intrinsic contact angle on a tapered surface), advancing ($\theta_a$) and receding contact angle ($O_r$) on the surface with nanoflower structure alone are 160°±1.8°, 162.4°±2.8°, and 158.8°±1.7°, respectively. At least five individual measurements were performed on each substrate.

Impact Experiments

The whole experimental setup was placed in ambient environment, at room temperature with 60% relative humidity. Water drops of ~13 μl and 6 μl (corresponding to radii ~1.45 mm and 1.10 mm, respectively) were generated from a fine needle equipped with a syringe pump (KD Scientific Inc.) from pre-determined heights. The dynamics of drop impact was recorded by a high speed camera (Fastcam SA4, Photron limited) at the frame rate of 10,000 fps with a shutter speed 1/93,000 sec, and the deformation of drops during impingement were recorded using Image J software (Version 1.46, National Institutes of Health, Bethesda, Md.).

It should be understood that certain features of the invention, which are, for clarity, described in the content of separate embodiments, may be provided in combination in a single embodiment. Conversely, various features of the invention which are, for brevity, described in the content of a single embodiment, may be provided separately or in any appropriate sub-combinations. It is to be noted that certain features of the embodiments are illustrated by way of non-limiting examples. Also, a skilled person in the art will be aware of the prior art which is not explained in the above for brevity purpose. For example, a skilled in the art is aware of the prior art listed below. Contents of this prior art are incorporated herein in their entirety.

REFERENCES

1. Richard, D., Clanet, C. & Quéré, D. Contact time of a bouncing drop. Nature 417, 811 (2002).
2. Bird, J. C., Dhiman, R., Kwon, H.-M. & Varanasi, K. K. Reducing the contact time of a bouncing drop. Nature 503, 385-388 (2013).
3. Jung, S., Tiwari, M. K., Doan, N. V. & Poulikakos, D. Mechanism of supercooled droplet freezing on surfaces. Nat. Commun. 3, 615 (2012).
4. Mishchenko, L. et al. Design of ice-free nanostructured surfaces based on repulsion of impacting water droplets. ACS Nano 4, 7699-7707 (2010).
5. Stone, H. A. Ice-phobic surfaces that are wet. ACS Nano 6, 6536-6540 (2012).
6. Chen, X. et al. Nanograssed micropyramidal architectures for continuous dropwise condensation. Adv. Funct. Mater. 21, 4617-4623 (2011).
7. Blossey, R. Self-cleaning surfaces-virtual realities. Nat. Mater. 2, 301-306 (2003).
8. Tuteja, A. et al. Designing superoleophobic surfaces. Science 318, 1618-1622 (2007).
9. Deng, X., Mammen, L., Butt, H. J. & Vollmer, D. Candle soot as a template for a transparent robust superamphiphobic coating. Science 335, 67-70 (2012).
10. Okumura, K., Chevy, F., Richard, D., Quéré, D. & Clanet, C. Water spring: A model for bouncing drops. Europhys. Lett. 62, 237 (2003).
11. Reyssat, M., P_epin, A., Marty, F., Chen, Y. & Quéré, D. Bouncing transitions on microtextured materials. Europhys. Lett. 74, 306 (2006).
12. Bartolo, D. et al. Bouncing or sticky droplets: Impalement transitions on superhydrophobic micropatterned surfaces. Europhys. Lett. 74, 299 (2006).
13. McCarthy, M. et al. Biotemplated hierarchical surfaces and the role of dual length scales on the repellency of impacting droplets. Appl. Phys. Lett. 100, 263701 (2012).
14. Moulinet, S. & Bartolo, D. Life and death of a fakir droplet: Impalement transitions on superhydrophobic surfaces. Eur. Phys. J. E. 24, 251-260 (2007).
15. Jung, Y. C. & Bhushan, B. Dynamic effects of bouncing water droplets on superhydrophobic surfaces. Langmuir 24, 6262-6269 (2008).
16. Cha, T. G., Yi, J. W., Moon, M. W., Lee, K. R. & Kim, H. Y. Nanoscale patterning of micro-textured surfaces to control superhydrophobic robustness. Langmuir 26, 8319-8326 (2010).
17. Tran, T. et al. Droplet impact on superheated microstructured surfaces. Soft Matter 9, 3272{93282 (2013).
18. Chen, X. et al. Synthesis and characterization of superhydrophobic functionalized $Cu(OH)_2$ nanotube arrays on copper foil. Appl. Surf. Sci. 255, 4015-4019 (2009).
19. Clanet, C., B_eguin, C., Richard, D., Quéré, D. et al. Maximal deformation of an impacting drop. J. Fluid Mech. 517, 199-208 (2004).
20. Vakarelski, I. U., Patankar, N. A., Marston, J. O., Chan, D. Y. C. & Thoroddsen, S. T. Stabilization of leidenfrost vapour layer by textured superhydrophobic surfaces. Nature 489, 274-277 (2012).
21. Lembach, A. N. et al. Drop impact, spreading, splashing, and penetration into electrospun nanofiber mats. Langmuir 26, 9516-9523 (2010).
22. Deng, X., Schellenberger, F., Papadopoulos, P., Vollmer, D. & Butt, H. J. Liquid drops impacting superamphiphobic coatings. Langmuir 29, 7847-7856 (2013).
23. Xu, L., Zhang, W. W. & Nagel, S. R. Drop splashing on a dry smooth surface. Phys. Rev. Lett. 94, 184505 (2005).
24. Wenzel, R. N. Resistance of solid surfaces to wetting by water. Ind. Eng. Chem. 28, 988-994 (1936).
25. Cassie, A. B. D. & Baxter, S. Wettability of porous surfaces. Trans. Faraday Soc. 40, 546-551 (1944).
26. Lafuma, A. & Quéré. Superhydrophobic states. Nat. Mater. 2, 457-460 (2003).
27. Verho, T. et al. Reversible switching between superhydrophobic states on a hierarchically structured surface. Proc. Natl. Acad. Sci. 109, 10210-10213 (2012).
28. Yarin, A. Drop impact dynamics: Splashing, spreading, receding, bouncing. Annu. Rev. Fluid Mech. 38, 159-192 (2006).
29. Quéré, D. Wetting and roughness. Ann. Rev. Mater. Res. 38, 71-99 (2008).
30. Zheng, Y. et al. Directional water collection on wetted spider silk. Nature 463, 640 (2010).

The invention claimed is:

1. A superhydrophobic surface arrangement for generating, upon contact by water droplets, pancaking bouncing and reducing liquid contact time, consisting of an array of posts residing on a surface and extending from the surface, said posts having an elongate configuration with a base portion at one end and an upper portion at an opposite end, wherein:
said posts have a height from 1 to 2 mm;
a center to center distance of two adjacent said posts is from 0.1 to 0.4 mm;
spacing of said two adjacent posts is from 0.05 to 0.3 mm;
said posts have a base with a width or diameter of 0.05 to 0.2 mm;
said posts have atop with a width or diameter of 0.02 to 0.2 mm;
said surface arrangement has a Weber number with respect to water droplets of 12.6 to 80; and
said posts have a profile selected from a straight post or a conical post profile wherein by way of the dimensions of said posts and the configuration of the straight or conical profile of said posts and the Weber number, the surface arrangement in use pancake bouncing of liquid droplets and reduction of contact time of the liquid droplets are effected.

2. An arrangement as claimed in claim 1, wherein when said posts have the straight profile, the posts are in the form of a square column.

3. An arrangement as claimed in claim 2, wherein when said posts have the conical profile, top ends of the posts have a truncated profile with a substantially flat top.

4. A substrate comprising a superhydrophobic arrangement as claimed in claim 1.

5. A method of manufacture a substrate as claimed in claim 4, comprising steps of forming said posts by wire cutting and cyclic chemical etching.

6. A method as claimed in claim 5, wherein said posts are formed from cooper or copper wire.

* * * * *